2,829,136
CATALYTIC PROCESS

Peter Fotis, Jr., Highland, and Donald L. Esmay, Munster, Ind., assignors to Standard Oil Company, Chicago, Ill., a corporation of Indiana No Drawing. Application September 30, 1954
Serial No. 459,518

12 Claims. (Cl. 260—94.9)

This invention relates to a novel catalytic process for the conversion of ethylene to normally solid polymeric materials. More particularly, the present invention relates to a process for the conversion of ethylene to polymers by contact with lithium hydride.

One object of our invention is to provide novel and highly useful catalysts for the preparation of normally solid polymers from ethylene or ethylene-containing gas mixtures. Another object is to provide a relatively low temperature, low pressure process for the conversion of gas streams containing ethylene into substantial yields of normally solid polymers having molecular weights ranging upwardly from 300 or specific viscosities, as hereinafter defined, above about 1000. These and other objects of our invention will become apparent from the following description thereof.

Briefly, the inventive process comprises the conversion of ethylene to polymeric materials including normally solid polymers ranging in consistency from grease-like to wax-like polymers, by contacting ethylene with an added polymerization catalyst consisting essentially of lithium hydride at a suitable polymerization temperature between about 100° C. and about 350° C. for a period of time sufficient to effect the desired conversion, followed by recovery of the solid polymeric materials thus produced. The partial pressure of ethylene in the polymerization operation may range upwardly from about one atmosphere, but at ethylene partial pressures below about 500 p. s. i., the polymerization rate is relatively low; in order to obtain more desirable rates of ethylene polymerization to produce normally solid polymers, we prefer to employ ethylene partial pressures within the polymerization zone in excess of 500 p. s. i., for example pressures within the range of about 500 to about 5000 p. s. i.

For use in our invention, the lithium hydride may be supported and extended by suitable methods upon porous and non-porous solid materials.

Suitable supports for lithium hydride include the well known catalyst carriers. Examples of porous supporting materials are various inorganic gels or precipitates such as silica, titania, zirconia and aluminas. Activated carbons, especially activated coconut charcoal, are also suitable porous supporting materials for lithium. Even various salts, such as sodium chloride and the like may be employed as supports for lithium hydride in the polymerization process of our invention.

Suitable alumina supports for lithium hydride include the activated adsorptive aluminas of commerce, which are known to be members of the gamma-alumina family, including the so-called eta-alumina (note, for example, P. J. Nahin et al., Ind. Eng. Chem., 2021 (1949); H. C. Stumpf et al., Ind. Eng. Chem. 42, 1398-1403 (1950); M. K. B. Day et al., J. Phys. Chem. 57, 946–950 (December 1953); J. F. Brown et al., J. Chem. Soc. 1953, 84); argillaceous materials, particularly montmorillonitic clays and bauxite, for example, clays and clay-like materials which have heretofore been employed in the catalytic cracking of hydrocarbon oils to produce gasoline, such as the acid-treated clays (Filtrol, Superfiltrol, etc.); synthetic silica-alumina composites containing at least about 1% of alumina, for example, the calcined silica-alumina composites (which may also contain magnesia, thoria or zirconia) which have heretofore been employed in the catalytic cracking of hydrocarbon oils (note, for example, "Advances in Catalysis," vol. IV, pages 1+, especially pages 6 and 7, by R. C. Hansford, published by Academic Press, Inc., N. Y., 1952, and, in the same volume, a chapter by H. E. Ries, Jr., pages 87 and following, especially the tables at pages 93–4); and fluorided gamma-aluminas. Gamma-aluminas may be employed containing up to about 90 weight percent of oxides of metals such as titania and zirconia.

Desirable alumina-containing adsorbent materials have BET surface areas in the range of about 100 to about 700 square meters per gram, more often about 150 to 300 square meters per gram, and average pore radius of about 10 to 100 A. usually to the order of about 25 A.

The dispersion of the lithium hydride on the supporting material can be effected by any known method and the method of dispersion does not, per se, form part of the present invention. For example, dispersion of lithium on the supporting material may be effected by melting lithium onto the heated supporting material, employed in the form of a powder, in the presence of a stream of an inert gas such as helium, which serves to maintain the supporting particles in the form of an agitated or fluidized bed. Lithium may be dispersed onto the supporting material in the absence of a fluidizing gas, while effecting agitation of the supporting material by conventional mixing techniques. Another technique involves contacting a dispersion of lithium in a hydrocarbon reaction medium with particles of the supporting material. Other methods known in the art for distributing alkali metals on solid supports may also be employed. The lithium extended upon the supporting solid material can be treated with hydrogen at suitable temperatures between about 50° C. and about 400° C. and hydrogen pressures of about 15 p. s. i. to about 1500 p. s. i. or even more.

Lithium hydride and solid supporting materials can be added as discrete masses to the polymerization reaction zone. Even when lithium hydride and the solid supporting materials are added separately to the reaction zone, they combine therein to produce a catalyst which is a dispersion of lithium hydride upon the supporting material. It will be understood, however, that we are not bound by any theoretical explanation.

The concentration of lithium hydride with respect to the solid supporting material may range from about 1 to about 50% by weight and is usually of the order of about 5 to about 25% by weight. The catalyst can be employed in various forms and sizes, e. g., as powder, granules, microspheres, lumps, or shaped pellets.

Molten lithium may be finely dispersed in an inert hydrocarbon medium, e. g. a petroleum white oil, and the dispersion may be treated with hydrogen to produce the lithium hydride catalyst.

The proportion of lithium hydride, based on ethylene, may range upwardly from 1 weight percent and may be, for example, in the range of about 5 to about 25 weight percent.

The ethylene charging stock may contain inert hydrocarbons, as in refinery gas streams, for example, methane, ethane, propane, etc. However, it is preferred to employ as pure and concentrated ethylene charging stocks as it is possible to obtain. It is desirable to minimize or avoid the introduction of higher olefins, acetylene, oxygen, carbon dioxide, water, sulfur compounds or other reactive materials into contact with the catalyst.

The ethylene can be polymerized in the gas phase by contact with the catalyst. Upon completion of the desired polymerization reaction it is then possible to treat the catalyst for the recovery of the solid polymerization products, for example by extraction with suitable solvents, particularly low-boiling aromatics such as benzene, toluene, xylenes, etc.

In effecting contacting of ethylene with the catalyst, it is highly desirable to supply to the reaction zone a liquid medium which undergoes little or no reaction with ethylene under the selected polymerization reaction conditions and which serves both as a reaction medium and a solvent for the solid reaction products. Suitable liquid reaction media for polymerization include liquid saturated hydrocarbons, viz. alkanes and cycloalkanes. Aromatic hydrocarbons such as benzene, t-alkylbenzenes such as t-butylbenzene and similar aromatic hydrocarbons which contain no alkyl groups in which hydrogen is bound to the alpha-carbon atom of the alkyl group may be employed, providing the severity of the reaction conditions (especially time and temperature) is minimized to avoid substantial alkylation of these hydrocarbons by ethylene. Alkylbenzenes such as toluene, ethylbenzene, xylenes and the like may be employed, but are not preferred.

Either pure liquid alkanes or cycloalkanes or commercially available mixtures, freed of catalyst poisons, can be employed. For example, we can employ straight run naphthas or kerosenes containing alkanes and cycloalkanes. Specifically, we can employ liquid or liquefied alkanes such as n-butane, n-pentane, n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, decalin, methyldecalins, dimethyldecalins and the like.

The liquid hydrocarbon reaction medium should be freed of catalyst poisons before use in the present invention by treatment with calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

Although the ethylene polymerization temperature range encompasses temperatures between about 100° C. and about 350° C., ordinarily we prefer to employ the range of about 125° C. to about 250° C. with supported lithium hydride catalysts in order to maximize the yield of solid or high molecular weight polymer. With unsupported lithium hydride, we prefer to use the temperature range of about 190° C. to about 300° C.

Ethylene partial pressures may be varied within the range of about 15 p. s. i. g. to the maximum pressure which can economically be employed in suitable commercial equipment, for example up to as much as 50,000 p. s. i. g. A convenient ethylene partial pressure range for the manufacture of solid polymers by the use of the present catalysts is about 200 to about 10,000 p. s. i., which constitutes a distinct advantage over the commercial high pressure ethylene polymerization processes which apparently require operating pressures in the range of about 20,000 to about 50,000 p. s. i.

The contact time or space velocity employed in the polymerization process will be selected with reference to the other variables, catalysts, the specific type of product desired and the extent of ethylene conversion desired in any given run or pass over the catalyst. In general, this variable is readily adjustable to obtain the desired results. In operations in which the ethylene is caused to flow continuously into and out of contact with the solid catalyst, suitable liquid hourly space velocities are usually selected between about 0.1 and about 10 volumes, preferably about 0.5 to 5 or about 2 volumes of ethylene solution in a liquid reaction medium.

The amount of ethylene in such solution may be in the range of about 2 to 50% by weight, preferably about 2 to about 10 weight percent or, for example, about 5 to 10 weight percent. When the ethylene concentration in the liquid reaction medium is decreased below about 2 weight percent, the molecular weight and melt viscosity of the polymeric products tend to drop sharply. In general, the rate of ethylene polymerization tends to increase with increasing concentration of the ethylene in the liquid reaction medium. However, the rate of ethylene polymerization to form high molecular weight, normally solid polymers is preferably not such as to yield said solid polymers in quantities which substantially exceed the solubility thereof in said liquid reaction medium under the reaction conditions, usually up to about 5–7 weight percent, exclusive of the amounts of polymeric products which are selectively adsorbed by the catalyst. Although ethylene concentrations above 10 weight percent in the liquid reaction medium may be used, solutions of ethylene polymer above 5–10% in the reaction medium become very viscous and difficult to handle and severe cracking or spalling of the catalyst particles or fragments may occur, resulting in catalyst carry-over as fines with the solution of polymerization products and extensive loss of catalyst from the reactor.

Temperature control during the course of the ethylene conversion process can be readily accomplished owing to the presence in the reaction zone of a large liquid mass having relatively high heat capacity. The liquid hydrocarbon reaction medium can be cooled by heat exchange inside or outside the reaction zone.

In batch operations, operating periods between one-half and about 20 hours or even longer are employed and the reaction autoclave is charged with ethylene as the pressure falls as a result of the olefin conversion reaction. The reaction period should be sufficiently long to permit substantial ethylene conversion to a solid polymer.

The following specific examples and data are introduced in order to illustrate but not unduly to limit the invention. The exemplary operations were effected in 250 cc. capacity stainless steel-lined pressure vessels provided with a magnetically-actuated stirrup-type stirrer which was reciprocated through the reaction zone (Magne-Dash reactors). Specific viscosities (Staudinger) which are reported hereinafter are defined as relative viscosity minus one, and relative viscosity is the ratio of the time of efflux of a solution of 0.125 g. polymer in 100 cc. of C. P. xylenes at 110° C. from the viscosimeter as compared with the time of efflux of 100 cc. of C. P. xylenes at 110° C. Melt viscosities were determined by the method of Dienes and Klemm, J. Appl. Phys. 17, 458–71 (1946).

In Table 1 are presented data obtained by the polymerization of ethylene at 140° C., 16 hours and initial pressure of 1000 p. s. i. in the presence of 100 ml. of purified benzene. In each instance the lithium hydride was finely dispersed on a supporting material prepared by coating molten lithium on said material and then reducing the lithium on the supporting material to lithium hydride with hydrogen. The catalysts were made from 10 grams of the supporting material and 1 gram of lithium. The data are as follows:

*Table 1*

| Example | Catalyst | $\Delta P$, p. s. i. | Solid Polymer | |
|---|---|---|---|---|
| | | | $g.$ | $\eta_{sp} \times 10^{4}$ |
| 1 | LiH on charcoal | 125 | 1.7 | 7,600 |
| 2 | LiH on NaCl | 125 | 1.9 | 9,600 |
| 3 | LiH on TiO$_2$ gel | 150 | 1.5 | 7,400 |

It will be noted that even under the very mild conditions described above, ethylene was converted to high molecular weight, normally solid polymers. It was found that the benzene was not alkylated by the ethylene under the above conditions and was recovered unchanged. The recovered benzene can be recycled for further use in the ethylene polymerization zone.

In Table 2 are presented the data obtained in the polymerization of ethylene at 220° C. for a period of 17 hours. When lithium hydride was used with a supporting material, the amounts of each were 1.5 g. and 10 g., respectively.

Table 2

| Example | Support | Solvent, 100 ml. | Max. Press, p. s. i. | ΔP, p. s. i. | Solid Polymer, g. |
|---|---|---|---|---|---|
| 4 | none | n-Heptane | 1,475 | 330 | 0.7 |
| 5 | do | Benzene | 1,975 | 775 | 1.7 |
| 6 | Charcoal | do | 1,540 | 440 | 2.1 |
| 7 | Al$_2$O$_3$ | do | 1,375 | 575 | 2.7 |

Under these more stringent conditions of temperature and ethylene pressure some alkylation of the benzene solvent occurred. The alkylated solvent can be recycled to the reaction zone and re-used.

The polymers produced by the process of the present invention can be blended with polyethylenes produced by other processes. The solid polymers produced by the process of the present invention can be blended in desired proportions with hydrocarbon oils, waxes such as paraffin or petrolatum waxes, with ester waxes, with high molecular weight polybutylenes, and with other organic materials. Small proportions between about .01 and about 1 percent of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products can be employed in small proportions to substantially increase the viscosity of fluent liquid hydrocarbon oils and as gelling agents for such oils.

The polymers produced by the present process can be subjected to chemical modifying treatments, such as halogenation, halogenation followed by dehalogenation, sulfohalogenation by treatment with sulfuryl chloride or a mixture of sulfur dioxide and chlorine, sulfonation, and other reactions to which hydrocarbons may be subjected.

The use of hydrides of alkali metals having atomic numbers of at least 11 in conjunction with alumina-containing adsorbents for the polymerization of ethylene to produce normally solid polymers is described and claimed in our copending application for United States Letters Patent, Serial No. 459,517, filed of even date herewith.

Having thus described our invention, what we claim is:

1. A process for producing a solid polymer, which process comprises introducing a charging stock consisting essentially of ethylene and a catalyst consisting essentially of lithium hydride into a polymerization zone, effecting contacting of ethylene and lithium hydride in said zone at a temperature between about 100° C. and about 300° C., and recovering a solid polymer of ethylene thus produced.

2. The process of claim 1 wherein the ethylene partial pressure is at least about 500 p. s. i.

3. The process of claim 1 wherein said contacting is effected in the presence of a liquid hydrocarbon which is substantially unreactive under the selected polymerization conditions.

4. The process of claim 1 wherein said contacting is effected in the presence of a liquid saturated hydrocarbon.

5. The process of claim 1 wherein the said polymerization temperature is between about 190° C. and about 300° C.

6. A process for producing a solid polymer, which process comprises introducing a charging stock consisting essentially of ethylene and an added catalyst consisting essentially of lithium hydride supported upon an inert, granular solid supporting material into a polymerization zone, effecting contacting of ethylene and said catalyst in said zone at a suitable polymerization temperature between about 100° C. and about 350° C. at an ethylene partial pressure of at least about 500 p. s. i., and recovering a solid polymer thus produced.

7. The process of claim 6 wherein said contacting is effected in the presence of a liquid hydrocarbon which is substantially unreactive under the selected polymerization conditions.

8. The process of claim 6 wherein said lithium hydride is supported upon an inert, adsorbent porous solid material.

9. The process of claim 6 wherein said solid material is alumina.

10. The process of claim 6 wherein said solid material is an activated carbon.

11. The process of claim 6 wherein said solid material is titania.

12. The process of claim 6 wherein said solid material is sodium chloride.

References Cited in the file of this patent

UNITED STATES PATENTS

| 2,212,155 | Ellis | Aug. 20, 1940 |
| 2,467,245 | Whitman | Apr. 12, 1949 |
| 2,691,647 | Field | Oct. 12, 1954 |
| 2,699,457 | Ziegler | Jan. 11, 1955 |